United States Patent [19]

Uken

[11] Patent Number: 5,601,668
[45] Date of Patent: *Feb. 11, 1997

[54] ENVIRONMENTAL SEALING

[75] Inventor: William D. Uken, Fremont, Calif.

[73] Assignee: Raychem Corporation, Menlo Park, Calif.

[*] Notice: The term of this patent shall not extend beyond the expiration date of Pat. No. 5,418,001.

[21] Appl. No.: 448,007

[22] Filed: May 23, 1995

Related U.S. Application Data

[63] Continuation of Ser. No. 195,727, Feb. 14, 1994, Pat. No. 5,418,001, which is a continuation of Ser. No. 666,552, Mar. 7, 1991, Pat. No. 5,286,516, which is a continuation of Ser. No. 275,444, Nov. 23, 1988, abandoned, which is a continuation-in-part of Ser. No. 126,655, Dec. 1, 1987, abandoned.

[51] Int. Cl.⁶ ............... B03D 5/12; H01B 13/00
[52] U.S. Cl. ............... 156/48; 156/49; 427/58; 427/117; 427/385.5; 524/474; 524/923
[58] Field of Search ............... 427/55, 385.5, 427/117; 156/48, 49, 51; 264/261, 254, 272.1; 524/474, 923

[56] References Cited

U.S. PATENT DOCUMENTS

| | | | |
|---|---|---|---|
| 3,714,110 | 1/1973 | Verdol et al. | 260/33.6 |
| 3,733,382 | 5/1973 | van Dijk | 264/47 |
| 3,747,037 | 7/1973 | Earing | 336/96 |
| 3,878,575 | 4/1975 | Dobbin et al. | 174/92 |
| 3,893,961 | 7/1975 | Walton et al. | 260/23 H |
| 4,025,600 | 5/1977 | Parr | 264/262 |
| 4,301,325 | 11/1981 | Hutchison | 174/76 |
| 4,533,398 | 8/1985 | Downey et al. | 428/380 |
| 4,595,635 | 6/1986 | Dubrow et al. | 428/447 |
| 4,596,743 | 6/1986 | Brauer et al. | 428/380 |
| 4,600,261 | 7/1986 | Debbaut | 339/116 C |
| 4,607,469 | 8/1986 | Harrison | 52/220 |
| 4,634,207 | 1/1987 | Debbaut | 339/116 C |
| 4,680,233 | 7/1987 | Camin et al. | 428/424.6 |
| 4,741,940 | 5/1988 | Reed | 428/68 |
| 4,888,070 | 12/1989 | Clark et al. | 156/48 |
| 4,963,698 | 10/1990 | Chang et al. | 174/77 R |
| 5,229,058 | 7/1993 | Uken et al. | 264/261 |
| 5,286,516 | 1/1994 | Uken | 417/58 |

FOREIGN PATENT DOCUMENTS

| | | | |
|---|---|---|---|
| 0100228A3 | 2/1984 | European Pat. Off. | H02G 15/18 |
| 0246855A3 | 11/1987 | European Pat. Off. | H01R 4/70 |
| 2104829 | 3/1983 | United Kingdom | B29C 1/00 |

*Primary Examiner*—Janyce Bell
*Attorney, Agent, or Firm*—Herbert G. Burkard; Yuan Chao

[57] ABSTRACT

A sealing material preferably having a cone penetration of at least 150 ($10^{-1}$ mm) and an ultimate elongation of at least 100% is subjected to mechanical deformation by milling or chopping in the presence of a solvent or suspending medium.

17 Claims, 1 Drawing Sheet

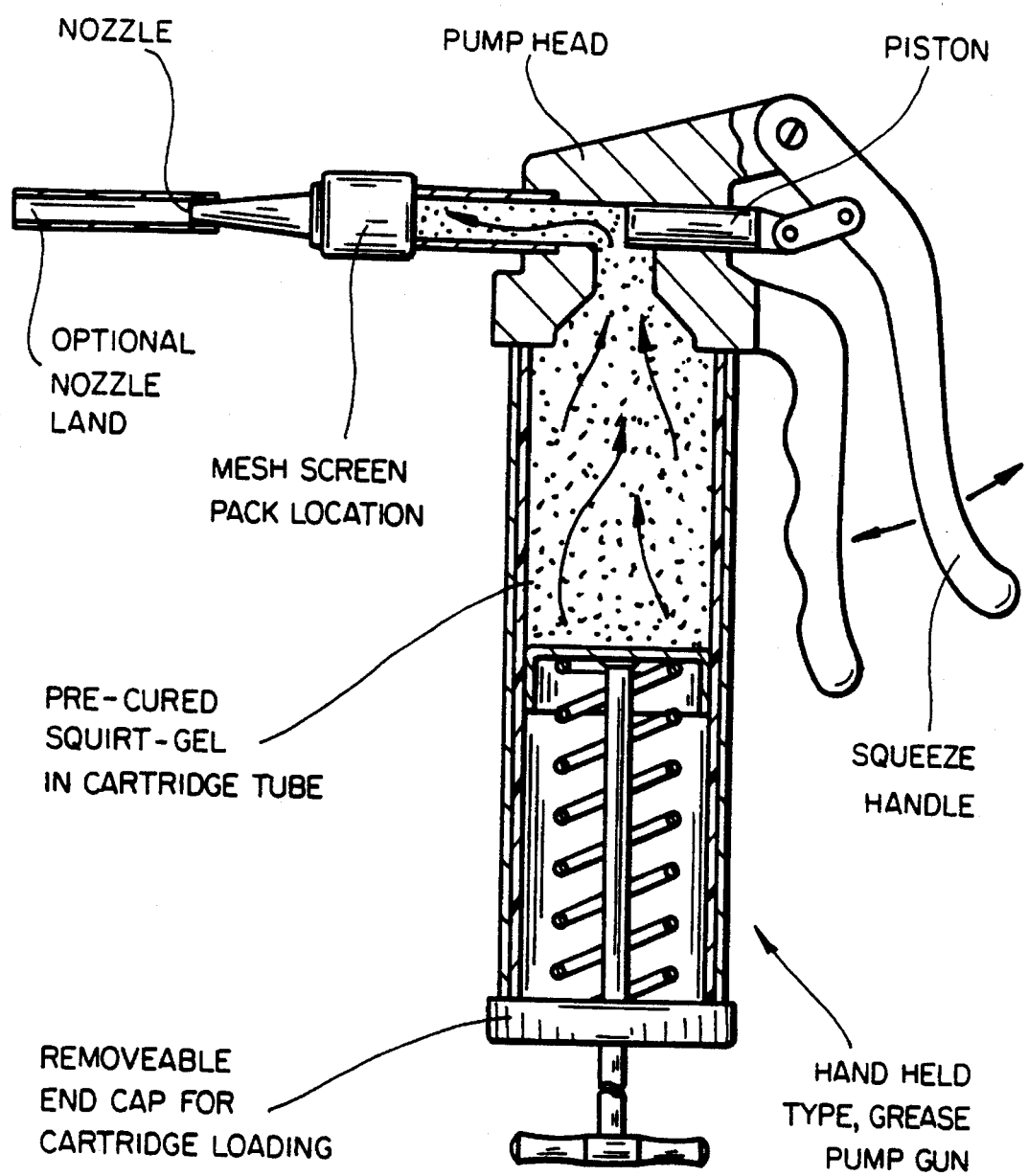
FIG_1

ENVIRONMENTAL SEALING

This application is a continuation of Ser. No. 08/195,727 filed Feb. 14, 1994, now U.S. Pat. No. 5,418,001 which is a continuation of Ser. No. 07/666,552 filed Mar. 7, 1991, now U.S. Pat. No. 5,286,416, issued Feb. 15, 1994 which is a continuation of U.S. Ser. No. 07/275,444 filed Nov. 23, 1988, now abandoned, which is a continuation-in-part of application Ser. No. 07/126,655 filed Dec. 1, 1987 now abandoned.

BACKGROUND OF THE INVENTION

The present invention relates to environmental sealing of substrates in the electrical, electronics, telecommunications, power and related industries, particularly to sealing of electrical terminals or other contacts and wire splices.

An environmental seal may be provided in many ways. For example, the substrate to be sealed may be sealed by surrounding it with some sealed box or other enclosure, it may be tape wrapped, it may be painted or it may be coated or surrounded with bulk sealing composition. The present invention is preferably concerned with this last category. Such sealing may be provided to protect the substrate from various contaminants, and in the case of electrical contacts particularly from water.

A problem arises in providing environmental protection due to an inherent conflict between the desire for ease of installation of the sealing means, and tightness of the final seal. This problem is often overcome by having the sealing means undergo some change in physical condition, for example a paint may be applied as a liquid that subsequently solidifies. An alternative is the provision of a thermoplastic material, such as a hot-melt adhesive, that may be softened or melted and then applied to the substrate and allowed to solidify. Another example is a curable composition that in its pre-cured state has a low viscosity allowing it to be poured in place around the substrate, after which it is caused to cure.

For many applications, dimensionally heat-recoverable articles are used to provide rugged, long-lasting environmental seals. Such an article may be supplied in an expanded, enlarged, form in which it is positioned loosely around the substrate and then heated to cause it to shrink into tight engagement with the substrate.

Recently it has been proposed to provide an environmental seal by means of a sealing material that is supplied pre-cured in some form of container which is then fixed relative to the substrate so that the sealing material is held under pressure against a surface of the substrate to be sealed. This technique may be contrasted with one where a sealing material in an uncured form is poured into a container to surround the substrate and is then cured in situ. Pre-curing has many advantages, particularly ease and speed of installation in the field.

An apparatus for providing environmental sealing in this way is disclosed and claimed in U.S. Pat. No. 4,600,261 (Debbaut), the disclosure of which is incorporated herein by reference. That patent discloses a protection apparatus comprising:

(a) an insulating gel characterized by
   (1) a cone penetration value from approximately 150–350 ($10^{-1}$ mm);
   (2) an ultimate elongation of at least approximately 200%;
   (3) a maximum tensile strength of approximately 20 psi;
   (4) a cohesive strength greater than its adhesive strength;
(b) first means to contain said gel;
(c) second means to retain said gel within said first means; and
(d) force means which acts on said first means so that said gel is maintained in compressive contact with said electrical contact and substantially encapsulates a conductive portion of said electrical contact, whereby upon release of said force means and a disengagement of said first means from said electrical contact, said gel remains substantially within said first means.

U.S. Pat. No. 4,634,207, the disclosure of which is incorporated herein by reference, discloses an apparatus for protecting a substrate, comprising (a) a gel, the gel being cured prior to coming into contact with any part of the substrate to be protected, the gel having a cone penetration value of 100–350 ($10^{-1}$ mm) and an ultimate elongation of at least 200%; and
(b) means for deforming the gel into close and conforming contact with the substrate.

Also disclosed is a process for protecting a substrate, comprising the steps of:

pressing together a substrate to be protected and an apparatus comprising a support member, a gel located on the support member, the gel being cured prior to coming into contact with any part of the substrate, the gel having a cone penetration value of 100 to 350 ($10^{-1}$ mm) and an ultimate elongation of at least 200%, and means for deforming the gel into close and conforming contact with the substrate, the apparatus and the substrate being pressed together so that the gel contacts the substrate and is deformed into close and conforming contact therewith.

The use of sealing materials for environmental protection is also disclosed in the following patents, the disclosures of each of which are incorporated herein by reference: U.S. Pat. Nos. 4,643,924 (Uken et al.), 4,690,831 (Uken et al.), 4,581,265 (Follette), 4,610,910 (Follette), 4,610,738 (Jervis), 4,600,804 (Howard), 4,701,574 (Shimirak), U.S. Ser. No. 901,971 filed 29 Aug. 1986 (Dubrow) equivalent to EP-A-0194872, U.S. Ser. No. 859,171 filed 29 May 1986 (Kayset) equivalent to EP-A-0225370, U.S. Pat. Nos. 4,662, 692 (Uken et al.), 4,647,717 (Uken), U.S. Ser. No. 767,555 (Story) filed 20 Aug. 1985 equivalent to EP-A-0213874, U.S. Ser. No. 801,018 (Gamarra) filed 22 Nov. 1985 equivalent to EP-A-0224389, and U.S. Ser. No. 945,219 (Chang) filed 22 Dec. 1986 equivalent to EP-A-0174165.

Cone penetration values in the above-mentioned specifications are unless the context otherwise requires or states, and are in this specification, expressed in units of $10^{-1}$ mm and are measured by ASTM D217-68 at 70° F. (21° C.) on an undisturbed sample using a standard 1:1 scale cone (cone weight 102.5 g, shaft weight 47.5 g), the penetration being measured after 5 seconds.

Ultimate elongation values in the above-mentioned specifications are unless the context otherwise requires or states, and are in this specification, as measured according to the technique of ASTMD 638-80 at 70° F. (21° C.) using a type 4 die to cut the sample and at a speed of 50 cm/minute.

A problem can arise in difficult circumstances with the above prior art sealing material (referred to in general terms herein as a "gel") and/or above prior art methods. That problem may arise where the substrate is of a complex shape since it may then be difficult to cause the gel fully to cover all surfaces of the substrate by forcing against the substrate a gel pre-cured or cast in a container. This is likely to be the case where the substrate is deep and must therefore penetrate a great distance into the gel, or where the substrate comprises many wires around which the gel must be caused to flow.

An alternative to pouring a liquid material around the substrate and then curing is likely to be unacceptable because it is impractical, time consuming and may result in the release of undesirable gasses during curing. The use of a hot-melt sealing material is frequently impractical due to the amount of heat required, and consequent possible damage to the substrate.

We have now found that this problem of installation of materials of the general type referred to as gels can be overcome by subjecting the material to mechanical deformation prior to use in the presence of a suitable solvent or extender or suspending medium. This then allows the material to be directed to the position where it is required, by for example extrusion through a nozzle. The step of extrusion itself may provide the desired mechanical deformation. We have found that the flow properties of the material may be suitably altered by this deformation, but that it may be able, where necessary, afterwards to cohere or to "knit" back together again, retaining a sufficient ultimate elongation or other property required during its service life.

SUMMARY OF THE INVENTION

Thus, the invention provides a method of environmentally protecting a substrate, which comprises:

(a) providing (preferably at ambient temperature) a sealing material having an ultimate elongation according to ASTMD 638-80 of at least 100%, preferably 200% to 300%, and a cone penetration according to ASTM D217-68 at 21° C. of greater than 100 ($10^{-1}$ mm);

(b) subjecting the material to mechanical deformation in the presence of a solvent or suspending medium; and (c) then causing (preferably at ambient temperature) the material to flow over the surface of the substrate.

The mechanical deformation preferably has the effect of breaking a cross-linked network of the material to create a suspension of gel or other particles. Deformation is preferably carried out in a mill, for example using steel rollers set to a gap of say from 0.0005–0.001, preferably 0.0001–0.0005 inch.

As an alternative to a mill, the material may be deformed by chopping with a blade or a wire.

The mechanical deformation may be carried out in the presence of a solvent such as methyl-ethyl ketone, but this may cause the material to swell with the risk of significant subsequent shrinkage. Thus, for many uses a suspending medium that is not a solvent may be used, an example being isopropyl alcohol. In any case, I prefer that the material be processed to produce a smooth, generally homogeneous suspension/solution. The resulting material may be thixotropic. The solvent or suspending medium may be volatile liquid.

The material and the shear process are preferably such that substantially no shear heat is generated.

The sealing material is preferably at least partially cross-linked, for example at least 0.01 to 6 cross-links per weight average molecule, more preferably 0.5 to 4, especially 0.5 to 2 cross-links A container may be provided around the substrate, into which the material is directed, preferably by extrusion from a material-dispensing gun, for example of the general type known as a grease-gun. Alternatively, the material may be extruded or otherwise directed into the container, and the container with the material then positioned around the substrate. We have found surprisingly that when the container is thus positioned with respect to the substrate, the sealing material flows (for example by folding or rolling) around the substrate causing it to be covered in a most satisfactory way. This may be compared to the covering that is achieved with similar gel materials that have not undergone shear. In that case the material appears to have a skin that first stretches and finally breaks, but even then the material may not properly squeeze back over the substrate without excessive trapping of air.

The effect of shear in allowing such materials to be directed by extrusion or otherwise, but to retain their elongation or elastic memory or other properties, was quite unexpected. Also unexpected was the effect of shear in improving the ability of such materials prepositioned in a container to be deformed around a substrate. Shear preferably causes the material to be fragmented, which may be regarded as causing comminution, fracture, or brecciation, or chopping, depending on the size and size distribution of resulting particles. Small particles are preferred.

The effect of deformation of the material may be regarded as comminution. Its flow properties are thereby improved. In the case of gels as referred to above, the resulting material may be regarded as an agglomeration of particles, each comprising a cross-linked network containing an uncross-linked or liquid component, the particles being loosely interconnected by adhering together, possibly by autoadhesion. Before the mechanical deformation the material may be regarded as a single cross-linked network containing the uncross-linked or liquid component. This change may be reflected in an increase in it G" value, G" being its loss modulus as determined by dynamic spectroscopy. The material may then be directed as desired by extrusion etc.

The invention therefore also provides a method of producing a sealing material which comprises:

(a) providing a material having an ultimate elongation according to ASTM D638-80 of at least 100%; and (b) fragmenting the material in the presence of a solvent or suspending agent.

Compression preferably occurs during extrusion, and this can be enhanced by correct choice of extrusion nozzle size and land length.

We have found also that advantageous sealing materials, particularly for the installation techniques disclosed herein, have a lower stress relaxation than that of otherwise similar prior art gel.

Stress relaxation is to be performed at 23° C. for 1 hour using a dynamic spectrometer (such as Rheometrics RDS-770, trade mark) in the transient parallel plate mode. A stress relaxation ratio may be deformed as the ratio of the stress, or modulus, G(T), at time t divided by peak stress achieved when the strain is applied at time t=0. The stress relaxation time is therefore the time at which the stress relaxation ratio is equal to, ie. 0.368; describing the exponential decay of an idealized stress relaxation curve.

We prefer that the sealing material has a stress relaxation time of less than 800 seconds, more preferably less than 700 seconds, particularly less than 500 seconds.

Sealing material may be supplied in any convenient way. For some uses the material may be extruded from a material-dispensing gun, and the invention therefore further provides a cartridge (optionally a disposable cartridge) having therein a cured material having an ultimate elongation of at least 100% according to ASTM D638-80 and a cone penetration value of 150–350 ($10^{-1}$ mm).

The sealing material of the invention or used in a method or article of the invention preferably has one or more of the following properties Cone penetration The cone penetration of the material before use is preferably greater than 100, more preferably greater than 150, particularly greater than 170, especially greater than 200 ($10^{-1}$ mm). It is preferably less than 400, more preferably less than 350, especially less than 300 ($10^{-1}$ mm).

Ultimate elongation

The ultimate elongation of the material before use is preferably greater than 50%, more preferably greater than 100, particularly greater than 200%, more particularly greater than 300%.

Storage modulus (G')

Storage modulus of the material before use is determined by dynamic spectroscopy (using for example a Rheometrics RDS-7700, trade mark) measured at 24° C. on a 25 mm diameter disc at 1 Hz frequency. G' is preferably less than $10^7$ dynes/cm$^2$, more preferably less than $5\times10^6$ dynes/cm$^2$, particularly less than $10^6$ dynes/cm$^2$, especially less than $5\times10^5$ dynes/cm2

Tan delta

Tan delta of the material before use is the ratio between the loss modulus (G") and the storage modulus (G'), each in dynes/cm2, each determined by dynamic spectroscopy. Tan delta is preferably less than 1, ie. the storage modulus is preferably greater than the loss modulus. More preferably tan delta is less than 0.8, particularly less than 0.7.

Stress relaxation time

For the material after deformation, this is preferably less than 900 seconds, more preferably less than 700 seconds, particularly less than 500 seconds, especially less than 200 seconds Preferably it is greater than 10 seconds, particularly greater than 50 seconds It is desirable that the material relax as fast as possible initially (so that the material can easily surround a substrate) and then not relax further, so that it can be put and remain under compression.

Tack

The sealing material before and after deformation is preferably tacky, more preferably has high tack.

The means for mechanically deforming and for dispensing the sealing material preferably have one or more of the following characteristics.

The material and the means for dispensing are preferably such that the material can be dispensed under a pressure of less than 100 psi, more preferably less than 50 psi, particularly less than 20 psi, particularly less than 10 psi.

The flow rate of the material from the means for dispensing is preferably greater than 0.01 grams per second, more preferably greater than 0.1 grams per second, particularly greater than 1.0 grams per second, especially greater than 10 grams per second.

The material may be extruded through a nozzle of diameter greater than 0.075 cms, preferably greater than 0.1 cm, preferably greater than 0.2 cm. A smaller nozzle helps to stick the particles of comminuted material back together.

The nozzle land preferably has a length of at least 1 cm, more preferably at least 2 cm, particularly at least 3 cm. The land through which the material passes after deformation helps to cause pressure or flow orientation or gives the material time to relax some of its original memory before pressure reduction.

BRIEF DESCRIPTION OF THE DRAWINGS

FIG. 1 shows a material-dispensing gun.

DETAILED DESCRIPTION OF THE DRAWINGS

FIG. 1 shows a material dispensing gun containing a sealing material that has been subjected to milling in the presence of a solvent or suspending agent.

The sealing material is usually electrically insulating (ie. has a resistivity of at least $10^9$ ohm.cm), but is not necessarily so for some possible uses of the invention, e.g. when non-electrical substrates are being protected. Suitable sealing materials include materials made by gelling curable polyurethane precursor materials (as described for example in the patents referenced above in the presence of substantial quantities of a mineral oil, a vegetable oil or a plasticizer, or a mxiture of two or more of these. Thus we have obtained excellent results using sealing materials prepared by gelling components which are commercially available for the preparation of polyurethane gels in situ, the gelation being carried out, however, in the presence of a suitable amount, e.g. 30 to 70% by weight, of a suitable plasticizer, e.g. a trimellitate, or in the presence of a suitable animal or vegetable oil, e.g. 80 to 60%, preferably 80 to 70%, by weight of a mixture of mineral and vegetable oils in which the ratio by weight of mineral oil to vegetable oil is 0.7 to 2.4. Suitable sealing materials can also be prepared by curing reactive silicones with non-reactive extender silicones, and the invention includes the use of any sealing material having the desired cone penetration and elongation values. The sealing material may contain known additives such as moisture scavengers (e.g. benzoyl chloride), antioxidants, pigments and fungicides. The sealing material is preferably hydrolytically stable, moisture-insensitive, and substantially inert towards the substrate.

We claim:

1. A method of environmentally protecting a substrate which comprises:
   (a) providing a sealing material having an ultimate elongation according to ASTM D638-80 of at least 100% and a cone penetration according to ASTM D217-68 at 21° C. of greater than 100 ($10^{-1}$ mm);
   (b) subjecting the material to mechanical deformation in the presence of a solvent or suspending medium; and
   (c) then causing the material to flow over a surface of the substrate.

2. A method according to claim 1, in which the material has a cone penetration value of at least 150 ($10^{-1}$ mm).

3. A method according to claim 1, in which the material after subjection to shear, has a stress relaxation time, being the time at which the stress relaxation ratio is equal to $e^{-1}$, of less than 900 seconds.

4. A method according to claim 1, in which the material provided has a tan delta value, being the ratio of loss modulus to storage modulus as determined by dynamic spectroscopy, of less than 1.

5. A method according to claim 1, in which the material is subjected to shear by milling.

6. A method according to claim 1, in which the material is subjected to shear in the presence of a suspending medium that is not a solvent for that material.

7. A method according to claim 1, in which the material is mechanically deformed in such a way as to increase its G" value, G" being its loss modulus as determined by dynamic spectroscopy.

8. A method according to claim 1, in which the material provided is cross-linked.

9. A method according to claim 1, in which the substrate comprises an electrical terminal or wire splice.

10. A method according to claim 1, which additionally comprises maintaining the material under pressure against the surface.

11. The method according to claim 1 wherein the sealing material is a cross-linked silicone gel sealing material and has a cone penetration value before use of at least 170 ($10^{-1}$ mm) to less than 400 ($10^{-1}$ mm) and an elongation of greater than 200%.

12. A method of environmentally sealing a substrate which comprises:
 (a) providing a sealing material having an ultimate elongation according to ASTM D638-80 of at least 100% and a cone penetration according to ASTM D217-68 at 21° C. of greater than 100 ($10^{-1}$ mm);
 (b) providing a container around the substrate;
 (c) subjecting the material to shear; and
 (d) placing the material into the container such that it surrounds the substrate.

13. A method according to claim 12, in which:
 (a) the material is subjected to shear,
 (b) the container is provided around the substrate; and
 (c) then the material is placed into the container.

14. A method according to claim 12, in which:
 (a) the material is subjected to shear;
 (b) then the material is placed into the container; and
 (c) then the container with the material therein is positioned around the substrate.

15. The method according to claim 12 wherein the sealing material is a cross-linked silicone gel sealing material and has a cone penetration value before use of at least 170 ($10^{-1}$ mm) to less than 400 ($10^{-1}$ mm) and an elongation of greater than 200%.

16. A method of producing a sealing material, which comprises:
 (a) providing a material having an ultimate elongation according to ASTM D638-80 of at least 100% and a cone penetration according to ASTM D217-68 at 21° C. of greater than 100 ($10^{-1}$ mm); and
 (b) milling the material in the presence of a solvent or a suspending medium.

17. The method according to claim 16 wherein the sealing material is a cross-linked silicone gel sealing material and has a cone penetration value before use of at least 170 ($10^{-1}$ mm) to less than 400 ($10^{-1}$ mm) and an elongation of greater than 200%.

\* \* \* \* \*